United States Patent
Yi et al.

(10) Patent No.: US 7,715,361 B2
(45) Date of Patent: May 11, 2010

(54) APPARATUS AND METHOD FOR TRANSMITTING/RECEIVING A DOWNLINK SIGNAL IN A COMMUNICATION SYSTEM

(75) Inventors: Byoung-Ha Yi, Seoul (KR); In-Seok Hwang, Seoul (KR); Joong-Ho Jeong, Seoul (KR); Soon-Young Yoon, Seoul (KR); Jae-Hee Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 722 days.

(21) Appl. No.: 11/602,122

(22) Filed: Nov. 20, 2006

(65) Prior Publication Data

US 2007/0115890 A1     May 24, 2007

(30) Foreign Application Priority Data

Nov. 18, 2005  (KR) .................. 10-2005-0111002

(51) Int. Cl.
   *H04J 3/24*   (2006.01)
   *H04J 3/00*   (2006.01)
   *H04W 4/00*   (2009.01)

(52) U.S. Cl. ............... 370/349; 370/345; 370/338; 370/328; 370/336

(58) Field of Classification Search ......... 370/264–265, 370/310, 310.2, 312–314, 328–330, 332, 370/336–338, 347, 349–350, 432, 436–437, 370/458, 470–471, 474, 498, 536, 537, 542, 370/341, 344–345; 455/63.1, 114.2, 278, 455/296, 422.1, 434, 466, 450–451, 452.2, 455/509, 515, 517, 550.1, 556.2, 561, 67.13, 455/403, 418–419; 375/144, 148, 346, 348, 375/260–261, 279–280, 285, 298
See application file for complete search history.

(56) References Cited

U.S. PATENT DOCUMENTS

| | | | |
|---|---|---|---|
| 7,508,804 B2* | 3/2009 | Das et al. ................... 370/342 |
| 2002/0085623 A1* | 7/2002 | Madkour et al. ............ 375/148 |
| 2003/0223394 A1* | 12/2003 | Parantainen et al. ........ 370/336 |
| 2004/0028014 A1* | 2/2004 | Goldberg et al. ............ 370/337 |
| 2005/0107036 A1* | 5/2005 | Song et al. ................... 455/23 |
| 2006/0146757 A1* | 7/2006 | Harris ......................... 370/335 |
| 2007/0115890 A1* | 5/2007 | Yi et al. ...................... 370/331 |
| 2008/0123542 A1* | 5/2008 | Karlsson ..................... 370/252 |

FOREIGN PATENT DOCUMENTS

KR    102005004929    5/2005

* cited by examiner

*Primary Examiner*—Meless N Zewdu
(74) *Attorney, Agent, or Firm*—The Farrell Law Firm, LLP

(57) ABSTRACT

In a communication system, a first Downlink (DL) signal to be commonly received by all Mobile Stations (MSs) at a Base Station (BS) is generated. A second DL signal that all the MSs do not need to commonly receive is generated. The first DL signal is applied to an interference cancellation scheme. The first DL signal is transmitted in a first time interval. The second DL signal is transmitted in a second time interval.

38 Claims, 7 Drawing Sheets

APPARATUS AND METHOD FOR TRANSMITTING/RECEIVING A DOWNLINK SIGNAL IN A COMMUNICATION SYSTEM

PRIORITY

This application claims priority under 35 U.S.C. § 119 to an application filed in the Korean Intellectual Property Office on Nov. 18, 2005 and assigned Ser. No. 2005-111002, the contents of which are incorporated herein by reference.

BACKGROUND OF THE INVENTION

1. Field of the Invention

The present invention relates generally to an apparatus and method for transmitting/receiving a signal in a communication system, and more particularly to an apparatus and method for transmitting/receiving a downlink signal.

2. Description of the Related Art

Since limited resources, such as frequency, code and timeslot resources, are divided and used in multiple cells of a communication system with a cellular structure (hereinafter cellular communication system), Inter-Cell Interference (ICI) may occur. When the frequency resources are divided and used in the multiple cells of the cellular communication system, the ICI results in performance degradation. The frequency resources are reused to increase the overall capacity of the cellular communication system. Herein, the rate at which the same frequency resources can be reused is referred to as a "frequency reuse factor". The frequency reuse factor is defined by the number of cells in which the same frequency resources are unused.

FIG. 1 illustrates the structure of the conventional cellular communication system using the frequency reuse factor of 1.

In FIG. 1, it is assumed that three cells of the cellular communication system, i.e., a first cell 110, a second cell 120 and a third cell 130, have a 3-sector structure, respectively. The first cell 110 has the 3-sector structure of a first sector 111, a second sector 113 and a third sector 115. The second cell 120 has the 3-sector structure of a first sector 121, a second sector 123 and a third sector 125. The third cell 130 has the 3-sector structure of a first sector 131, a second sector 133 and a third sector 135. Assuming that the cellular communication system uses the frequency reuse factor of 1, all the sectors of the first to third cells 110 to 130 use the same frequency resources, i.e., the same Frequency Allocation (FA) F1.

Since the same FA F1 is used in the cells and sectors, a channel state is poor in a cell boundary region. For example, a Carrier-to-Interference and Noise Ratio (CINR) is very low. Thus, the probability of occurrence of a reception error is high even though a signal is transmitted at the most robust Modulation and Coding Scheme (MCS) level supportable in an associated cell.

FIG. 2 illustrates the structure of the DL frame of the conventional communication system.

Referring to FIG. 2, the DL frame includes a preamble field 210, a Frame Control Header (FCH) field 220, a MAP field 230 and a burst field 240.

In the preamble field 210, a preamble signal is transmitted to acquire synchronization between a transmitter, for example, a Base Station (BS), and a receiver, for example, a Mobile Station (MS), and to identify the BS. In the FCH field 220, an FCH is transmitted and contains information about a modulation scheme applied to the MAP field 230 and the length of the MAP field 230. Herein, a size of the FCH field 220 is fixed, for example, to 24 bits. A preset fixed MCS level, for example, a Quadrature Phase Shift Keying (QPSK) 1/16 level, is applied to the FCH field 220.

A MAP message is transmitted in the MAP field 230 and contains position information about Downlink (DL) and Uplink (UL) burst fields, modulation scheme information, and allocation information about the DL and UL burst fields, i.e., information about whether the DL and UL burst fields are dedicatedly allocated to a specified MS or are commonly allocated to unspecified MSs.

The burst field 240 contains dedicated burst fields 243, 245, 247 and 249 dedicatedly allocated to specified MSs and a common burst field 241 commonly allocated to unspecified MSs. In the dedicated burst fields 243, 245, 247 and 249, dedicated burst data targeting the specified MSs, for example, traffic data and a dedicated control message, are transmitted. In the common burst field 241, common burst data targeting the unspecified MSs, for example, a common control message, is transmitted. In FIG. 2, it is assumed that the dedicated control message is transmitted only in the dedicated burst field 247 and the traffic data is transmitted in the remaining dedicated burst fields 243, 245 and 249.

As described above, the MAP message to be transmitted in the MAP field 230, the common control message to be transmitted in the common burst field 241 and the dedicated control message to be transmitted in the dedicated burst field 247 are mandatory information for communication between the BS and the MSs. Thus, the BS applies the most robust MCS level supportable therein, for example, a QPSK 1/12 level, to the MAP field 230, the common burst field 241 and the dedicated burst field 247. Therefore, all the MSs at the BS can receive the MAP message, the common control message and the dedicated control message without error.

MCS levels mapped to channel states of target MSs are applied to the dedicated burst fields 243, 245 and 249 targeting the MSs. That is, the BS sets the MCS levels to be applied to the dedicated burst fields 243, 245 and 249 on the basis of the channel states fed back from the target MSs, i.e., Channel Quality Indications (CQIs). When setting the MCS levels based on the CQIs, the BS can use a link curve of a short-term CQI or an average CQI over a preset time interval.

The most robust MCS level supportable in the BS is applied to the dedicated burst field for transmitting the dedicated control message among the MAP field, the common burst field and the dedicated burst field as described with reference to FIG. 2 such that all the MS at the BS can normally receive the MAP message, the common control message and the dedicated control message. As the most robust MCS level supportable in the BS is applied to transmit the MAP message, the common control message and the dedicated control message, an amount of resources for a traffic data transmission, i.e., a size of the dedicated burst fields, is reduced. The dedicated control message is a control message targeting only a specified MS. However, as the most robust MCS level supportable in the BS is applied to the dedicated control message, a significant waste of resources may occur.

When the frequency reuse factor of 1 is used as described with reference to FIG. 1, the ICI may be caused by a neighbor BS. The MAP message, the common control message and the dedicated control message may not be normally received due to the ICI even though the most robust MCS level supportable in an associated BS is applied. In particular, when there is a region where the MAP message and the common control message are not normally received, the region is a service shadow region at the associated BS. In the service shadow region, service provision itself is impossible and service stability of the overall communication system is degraded.

SUMMARY OF THE INVENTION

Therefore, it is an object of the present invention to provide an apparatus and method for transmitting/receiving a DL signal in a communication system.

It is an object of the present invention to provide an apparatus and method for transmitting/receiving a DL signal that can improve service stability in a communication system.

It is an object of the present invention to provide an apparatus and method for transmitting/receiving a DL signal that can increase an amount of traffic data to be transmitted in a communication system.

In accordance with the present invention, there is provided an apparatus for transmitting a DL signal from a BS in a communication system, including a scheduler for scheduling a first DL signal to be commonly received by all MSs at the BS and a second DL signal that all the MSs do not need to commonly receive, and a transmitter for transmitting the first DL signal in a first time interval by applying the first DL signal to an interference cancellation scheme, and transmitting the second DL signal in a second time interval.

In accordance with the present invention, there is provided an apparatus for transmitting a DL signal from a BS in a communication system, including a scheduler for adding a DL MAP information element to be periodically transmitted in a DL MAP message, performing a UL scheduling process and generating a UL MAP message reflecting a UL scheduling result, scheduling a common control message, scheduling a dedicated burst signal that all MSs at the BS do not need to receive, adding scheduling information to the DL MAP message on a basis of a dedicated burst signal scheduling result, and repeating an operation for scheduling the dedicated burst signal and adding the scheduling information to the DL MAP message on the basis of the dedicated burst signal scheduling result until DL resources to be additionally allocated are not present, and a transmitter for transmitting the DL MAP message, the UL MAP message and the common control message in a first time interval by applying the DL MAP message, the UL MAP message and the common control message to an interference cancellation scheme, and transmitting the dedicated burst signal in a second time interval.

In accordance with the present invention, there is provided a method for transmitting a DL signal from a BS in a communication system, including generating a first DL signal to be commonly received by all MSs at the BS and a second DL signal that all the MSs do not need to commonly receive, transmitting the first DL signal in a first time interval by applying the first DL signal to an interference cancellation scheme, and transmitting the second DL signal in a second time interval.

In accordance with the present invention, there is provided a method for transmitting a DL signal from a BS in a communication system, including adding a DL MAP information element to be periodically transmitted in a DL MAP message, performing a UL scheduling process and generating a UL MAP message reflecting a UL scheduling result, scheduling a common control message, scheduling a dedicated burst signal that all MSs at the BS do not need to receive, adding scheduling information to the DL MAP message on a basis of a dedicated burst signal scheduling result, repeating the scheduling a dedicated burst signal and adding scheduling information steps until DL resources to be additionally allocated are not present, transmitting the DL MAP message, the UL MAP message and the common control message in a first time interval by applying the DL MAP message, the UL MAP message and the common control message to an interference cancellation scheme, and transmitting the dedicated burst signal in a second time interval.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. The following description will only include information necessary to understand an operation of the present invention. Accordingly, unnecessary detailed description will be omitted for the sake of clarity and conciseness.

Figure 3:
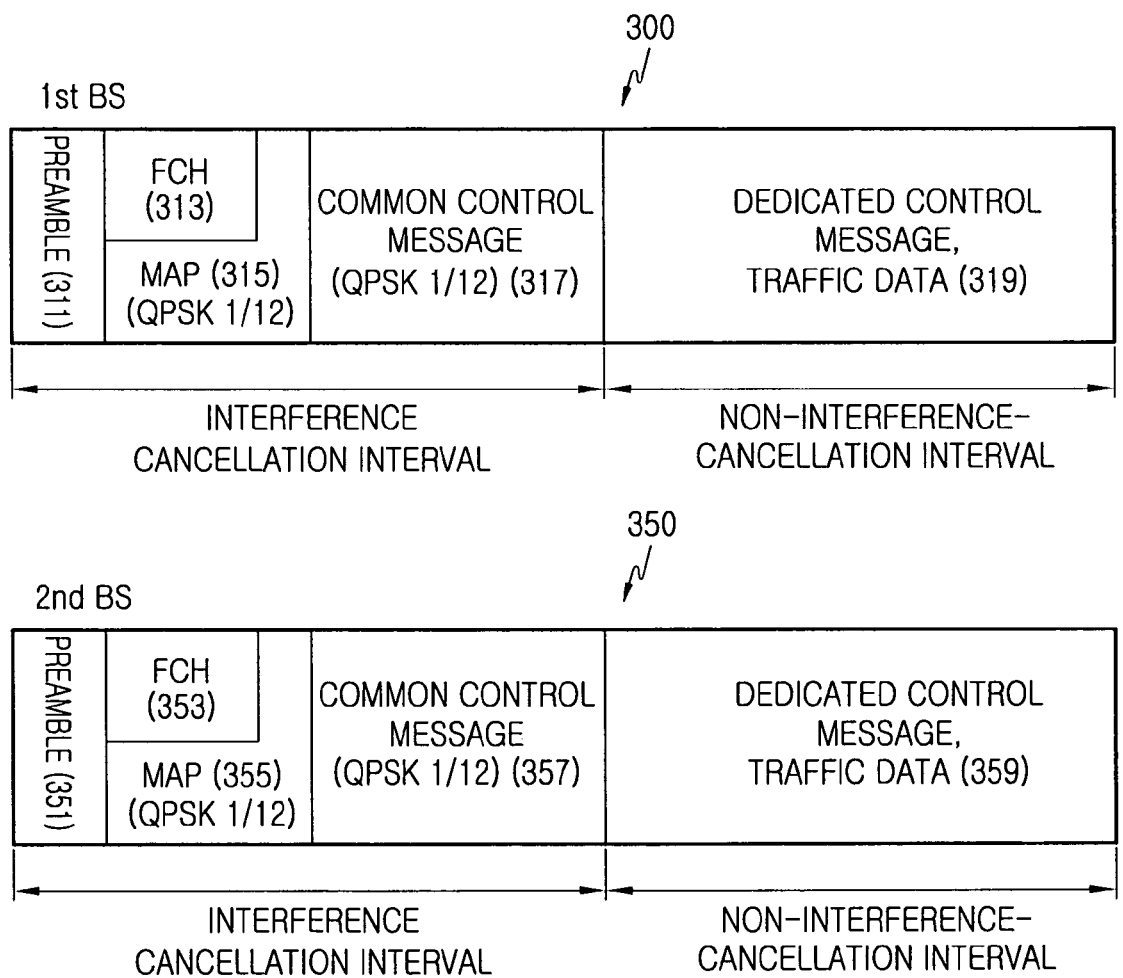
FIG. 3 illustrates a structure of a DL frame of a communication system in accordance with the present invention.

FIG. 3 illustrates a structure of a DL frame of a communication system in accordance with the present invention.

Figure 1:
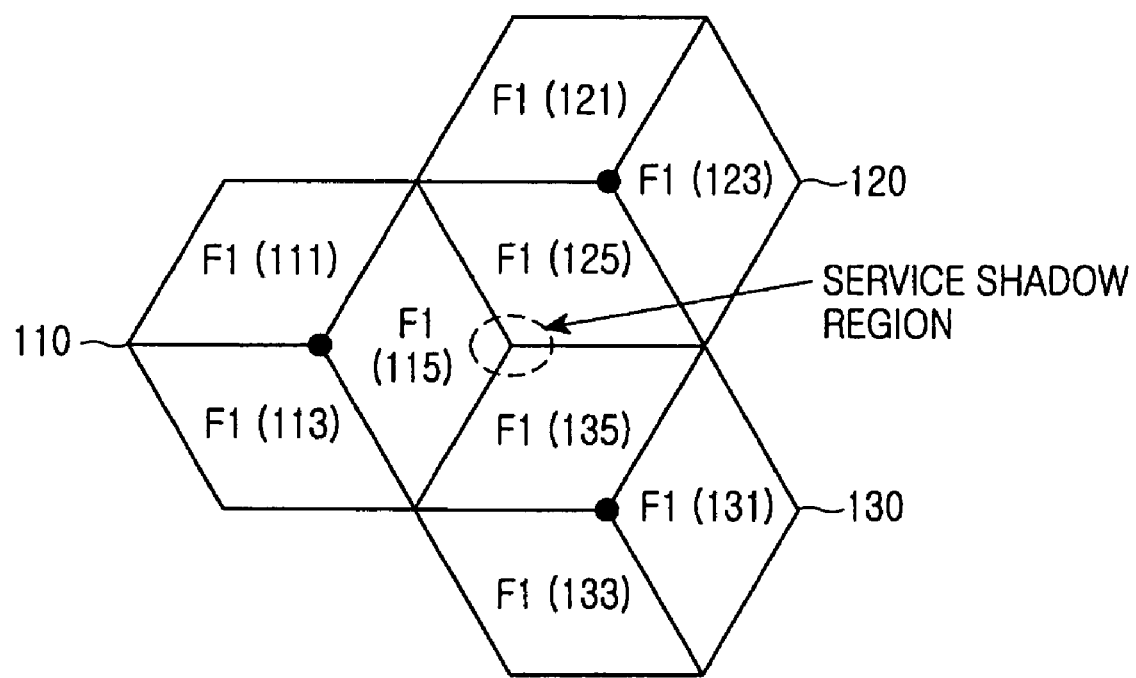
FIG. 1 illustrates a structure of a conventional cellular communication system using a frequency reuse factor of 1.
Figure 2:
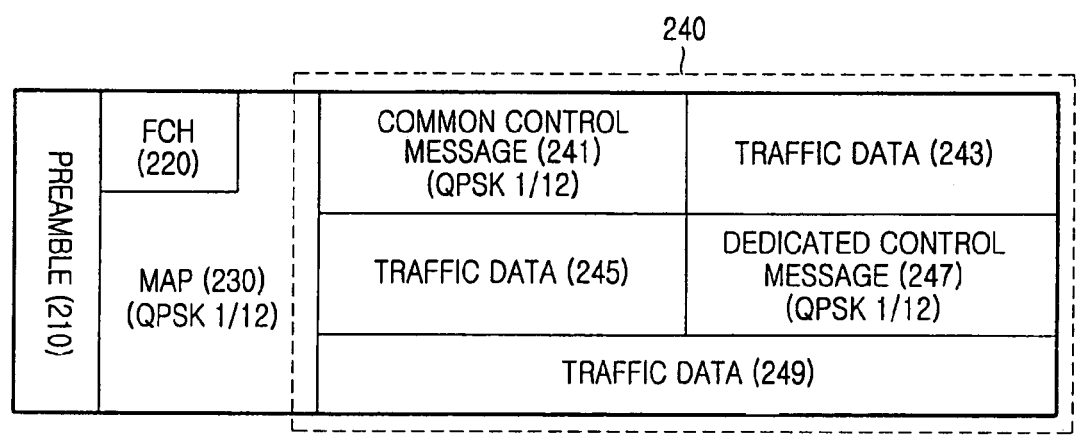
FIG. 2 illustrates a structure of a DL frame of the conventional communication system.

In FIG. 3, it is assumed that the communication system is a cellular communication system in which a frequency reuse factor is 1 as described with reference to FIG. 1. FIG. 3 illustrates DL frame structures of first and second BSs in multiple cells of the cellular communication system. Herein, one BS can cover multiple cells. However, for convenience of explanation, it is assumed that one BS covers only one cell in FIG. 3.

The DL frame 300 of the first BS includes a preamble field 311, an Frame Control Header (FCH) field 313, a MAP field 315, a common burst field 317 and a dedicated burst field 319.

In the preamble field 311, a preamble signal is transmitted to acquire synchronization between a transmitter, for example, the first BS, and a receiver, for example, a Mobile Station (MS), and to identify the BS. In the FCH field 313, an FCH is transmitted. The FCH contains information about a modulation scheme applied to the MAP field 315 and the length of the MAP field 315. Herein, a size of the FCH field 313 is fixed, for example, to 24 bits. A fixed Modulation and Coding Scheme (MCS) level, for example, a Quadrature Phase Shift Keying (QPSK) 1/16 level, is applied to the FCH field 313.

A MAP message is transmitted in the MAP field 315. The MAP message includes position information about DL and UpLink (UL) burst fields of the first BS, modulation scheme information, and allocation information about the DL and UL burst fields, i.e., information about whether the DL and UL burst fields are dedicatedly allocated to a specified MS or are commonly allocated to unspecified MSs. Herein, the common burst field 317 is commonly allocated to the unspecified MSs and the dedicated burst field 319 is dedicatedly allocated to the specified MS.

In the common burst field 317, common burst data targeting the unspecified MSs, for example, a common control message, is transmitted. In the dedicated burst field 319, dedicated burst data targeting the specified MS, for example, traffic data and a dedicated control message, are transmitted. The common control message includes, for example, system parameter broadcasting information and neighbor cell configuration information.

When a size of the common control message to be transmitted from the first BS is less than that of the common burst field 317, multiple common control messages can be concatenated and transmitted. When a size of the common control message to be transmitted from the first BS is more than that of the common burst field 317, the associated common control message can be fragmented and transmitted in multiple DL frames.

Figure 4:
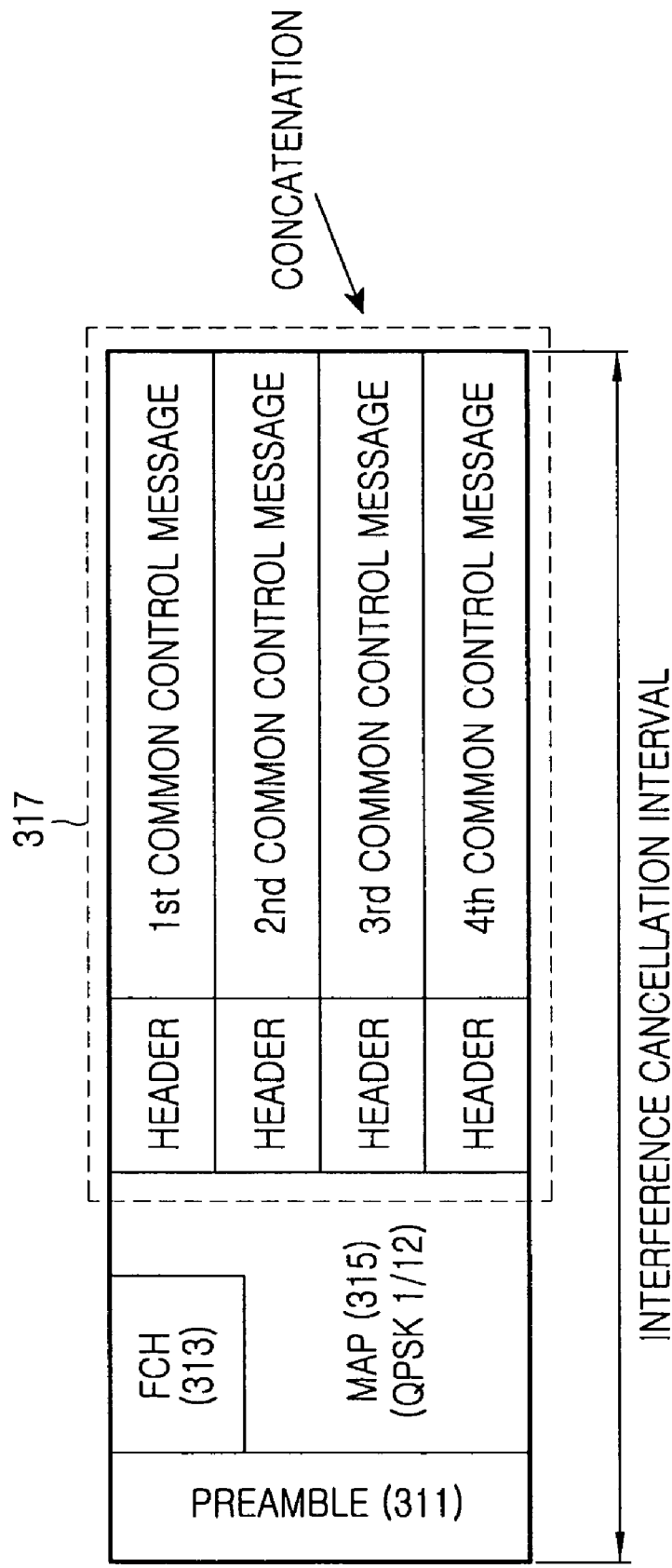
FIG. 4 illustrates a structure of a DL frame in which common control messages are concatenated and transmitted in accordance with the present invention.

FIG. 4 illustrates the DL frame structure in which the common control messages are concatenated and transmitted in accordance with the present invention.

It should be noted that the DL frame structure in which the common control messages are concatenated and transmitted will be described using the DL frame structure of the first BS in the DL frame structures of FIG. 3. The common control messages can be concatenated and transmitted also in the DL frame structure of the second BS.

A basic DL frame structure of FIG. 4 is the same as the DL frame structure of the first BS as described with reference to FIG. 3. In FIG. 4, it can be seen that multiple common control messages, i.e., first, second, third and fourth common control messages, are concatenated.

Figure 5:
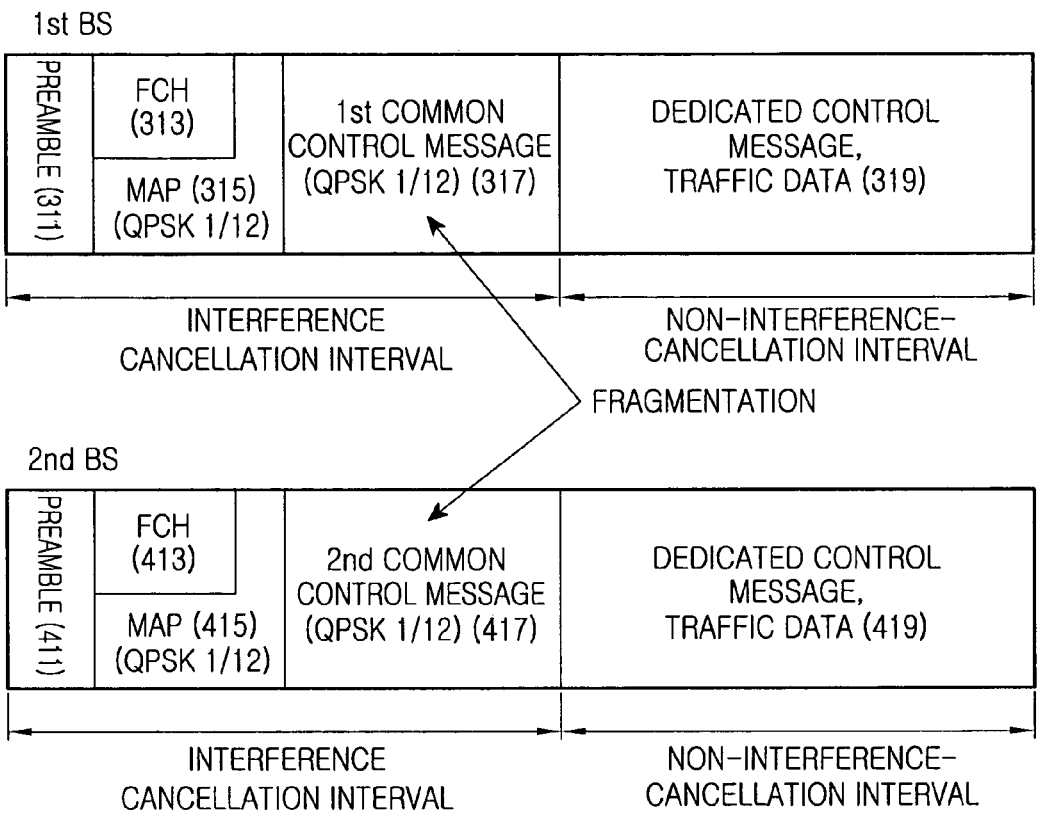
FIG. 5 illustrates a structure of a DL frame in which a common control message is fragmented and transmitted in accordance with the present invention.

FIG. 5 illustrates the DL frame structure in which the common control message is fragmented and transmitted in accordance with the present invention.

It should be noted that the DL frame structure in which the common control message is fragmented and transmitted will be described, for example, using the DL frame structure of the first BS in the DL frame structures of FIG. 3. The common control message can be fragmented and transmitted also in the DL frame structure of the second BS.

A basic DL frame structure of FIG. 5 is the same as the DL frame structure of the first BS as described with reference to FIG. 3. In FIG. 5, it can be seen that a size of the common control message to be transmitted from the first BS is larger than a size of a common burst field 317 and the common control message is fragmented and transmitted in a common burst field 417 of the next frame. That is, the common control message to be transmitted from the first BS is fragmented into two common control message parts, i.e., first and second common control message parts. The first common control message part is transmitted in the common burst field 317 of the first frame, and the second common control message part is transmitted in the common burst field 417 of the second frame.

A MAP message to be transmitted in a MAP field 315 and the common control message to be transmitted in the common burst field 317 are mandatory information for communication between the first BS and MSs. Thus, the first BS applies the most robust MCS level supportable therein, for example, a QPSK 1/12 level, to the MAP field 315 and the common burst field 317. Therefore, all the MSs at the first BS can receive the MAP message and the common control message.

The first BS sets an MCS level to be applied to a dedicated burst field 319 targeting an MS on the basis of a channel state fed back from the target MS, i.e., a Channel Quality Information (CQI).

Referring back to FIG. 3, the DL frame 350 of the second BS includes a preamble field 351, an FCH field 353, a MAP field 355, a common burst field 357 and a dedicated burst field 359.

In the preamble field 351, a preamble signal is transmitted to acquire synchronization between a transmitter, for example, the second BS, and a receiver, for example, an MS, and to identify the BS. In the FCH field 353, an FCH is transmitted. The FCH contains information about a modulation scheme applied to the MAP field 355 and the length of the MAP field 355. Herein, a size of the FCH field 353 is fixed, for example, to 24 bits. A preset fixed MCS level, for example, a QPSK 1/16 level, is applied to the FCH field 353.

A MAP message is transmitted in the MAP field 355 and includes position information about DL and UL burst fields of the second BS, modulation scheme information, and allocation information about the DL and UL burst fields, i.e., information about whether the DL and UL burst fields are dedicatedly allocated to a specified MS or are commonly allocated to unspecified MSs. Herein, the common burst field 357 is commonly allocated to the unspecified MSs and the dedicated burst field 359 is dedicatedly allocated to the specified MS.

In the common burst field 357, common burst data targeting the unspecified MSs, for example, a common control message, is transmitted. In the dedicated burst field 359, dedicated burst data targeting the specified MS, for example, traffic data and a dedicated control message, are transmitted.

The MAP message to be transmitted in the MAP field 355 and the common control message to be transmitted in the common burst field 357 are mandatory information for communication between the second BS and MSs. Thus, the second BS applies the most robust MCS level supportable therein, for example, a QPSK 1/12 level, to the MAP field 355 and the common burst field 357. Since the most robust MCS level supportable in the second BS is applied to the MAP field 355 and the common burst field 357, all the MSs at the second BS can receive the MAP message and the common control message.

Further, the second BS sets an MCS level to be applied to the dedicated burst field 359 targeting an MS on the basis of a channel state fed back from the target MS, i.e., a CQI.

When the frequency reuse factor of 1 is used in the cellular communication system, there is a service shadow region where a signal transmission/reception cannot be ensured due to Inter Cell Interference(ICI) even though the most robust MCS level supportable in an associated cell is applied. In order to improve the stability of the overall communication system by preventing the service shadow region, the present invention divides a DL frame structure into an interference cancellation interval in which an interference cancellation scheme is applied and a non-interference-cancellation interval in which no interference cancellation scheme is applied.

The interference cancellation interval includes fields in which signals incapable of being retransmitted, i.e., a preamble signal, an FCH, a MAP message and a common control message, are provided. The non-interference-cancellation interval includes fields in which signals capable of being retransmitted, i.e., traffic data and a dedicated control message, are provided. The interference cancellation interval is applied only to the signals incapable of being retransmitted because the complexity of an MS increases due to the applied interference cancellation scheme when a DL signal is transmitted using the interference cancellation scheme.

Specifically, the interference cancellation interval includes fields in which signals such as the preamble signal, the FCH, the MAP message and the common control message to be correctly received in the MS are transmitted because they cannot be retransmitted. In FIG. 3, the interference cancellation intervals include the preamble field 311, the FCH field 313, the MAP field 315, the common burst field 317, the preamble field 351, the FCH field 353, the MAP field 355 and the common burst field 357.

As described above, because the signals to be provided in the interference cancellation interval cannot be retransmitted, a preset interference cancellation scheme is applied to the fields included in the interference cancellation interval in each cell. A size of the interference cancellation interval can differ according to cells. The interference cancellation interval should be ahead of the non-interference-cancellation interval. Because the interference cancellation interval itself is not directly related to the present invention, a description is omitted herein.

The non-interference-cancellation interval includes fields in which signals such as a dedicated control message and traffic data can be retransmitted. That is, signals to be provided in the non-interference-cancellation interval can be retransmitted using a special retransmission scheme, for example, an Automatic Repeat ReQuest (ARQ) scheme or a hybrid ARQ (HARQ) scheme, even when error occurs in receiving an associated signal in an MS. In FIG. 3, the dedicated burst fields 319 and 359 are included in the non-interference-cancellation interval.

Since the signals to be provided in the fields included in the non-interference-cancellation interval can be retransmitted, any interference cancellation scheme does not need to be applied to the non-interference-cancellation interval in each cell. A size of the non-interference-cancellation interval can also differ according to cells. The non-interference-cancellation interval should be in the rear of the interference cancellation interval.

In the fields included in the non-interference-cancellation interval, an MCS level is set on the basis of channel states fed back from MSs, i.e., CQIs. As described above, the traffic data and the dedicated control message can be transmitted in the fields included in the non-interference-cancellation interval, i.e., the dedicated burst fields 319 and 359. Herein, an MCS level setting operation in the case of a traffic data transmission is different from that in the case of a dedicated control message transmission.

Specifically, when the traffic data is transmitted in the field included in the non-interference-cancellation field, an MCS level to be applied to the field included in the non-interference-cancellation interval is set using the performance of a generated link based on a short-term CQI to increase transmission capacity of the BS. The BS controls an operation in which traffic data can be transmitted by applying a relatively high MCS level to a DL frame capable of being provided to the associated MS in a good channel state on the basis of a short-term CQI $CQI_{TTI}(k)$ fed back from the MS at the associated time. If error occurs when the associated MS receives the traffic data, the BS retransmits the associated traffic data using the retransmission scheme and performs a control operation such that the associated MS can normally receive the traffic data.

When the dedicated control message is transmitted in the field included in the non-interference-cancellation interval, an MCS level to be applied to the field included in the non-interference-cancellation interval is set using the performance of a generated link based on an average or long-term CQI to decrease time delay due to retransmission. The BS generates a long-term CQI computed by averaging short-term CQIs $CQI_{TTI}(k)$ fed back from the MS at the associated times during a preset time interval and controls an operation in which the dedicated control message can be transmitted by applying a relatively high MCS level to a DL frame capable of being provided to the associated MS in a good channel state on the basis of the long-term CQI. If error occurs when the associated MS receives the dedicated control message, the BS retransmits the associated dedicated control message using the retransmission scheme and performs a control operation such that the associated MS can normally receive the dedicated control message.

The performance of the link generated on the basis of each of the short-term and long-term CQIs will be described with reference to Table 1.

TABLE 1

| Channel Modulation Rate | Short-term CQI (dB) | Long-term CQI (dB) |
| --- | --- | --- |
| QPSK 1/12 | −3.9 | 2.7 |
| QPSK 1/8 | −2.0 | 5.0 |
| QPSK 1/4 | 1.0 | 8.0 |
| QPSK 1/2 | 4.3 | 11.4 |
| QPSK 3/4 | 7.5 | 14.7 |
| 16 QAM 1/2 | 9.4 | 16.7 |
| 16 QAM 3/4 | 16.5 | 22.4 |
| 64 QAM 2/3 | 18.4 | 24.6 |
| 64 QAM 3/4 | 21.0 | 28.2 |
| 64 QAM 5/6 | 24.7 | 31.0 |

As shown in Table 1, a difference between the performances of links generated on the basis of the short-time CQI and the long-term CQI is significant at the same MCS level. That is, the link performance based on the short-term CQI is proper for a traffic data transmission in which a transmission time can be selected, and the link performance based on the long-term CQI is proper for a dedicated control message transmission in which it is difficult to select a transmission time.

Figure 6:
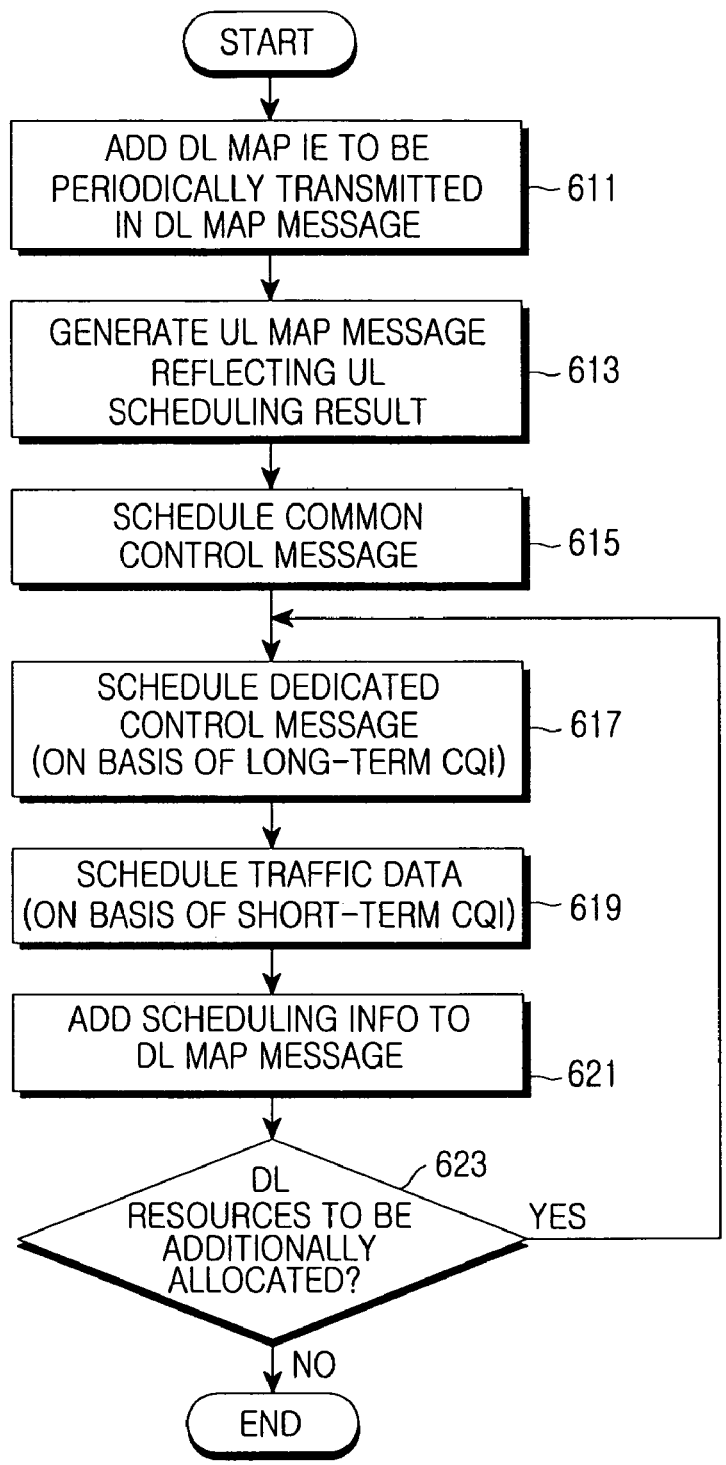
FIG. 6 is a flowchart illustrating a scheduling process of a BS in accordance with the present invention.

FIG. 6 is a flowchart illustrating the scheduling process of the BS in accordance with the present invention.

Referring to FIG. 6, the BS adds a DL MAP Information Element (IE) to be periodically transmitted in a DL MAP message in step 611 and then proceeds to step 613. The BS performs a UL scheduling process and generates a UL MAP reflecting a UL scheduling result in step 613 and then proceeds to step 615. The BS schedules a common control message in step 615 and then proceeds to step 617. The BS performs the scheduling process such that the common control message is concatenated or fragmented on the basis of its size.

The BS schedules a dedicated control message in step 617 and then proceeds to step 619. The BS schedules the dedicated control message on the basis of a long-term CQI fed back from an associated MS corresponding to a target of the dedicated control message. The BS schedules traffic data in step 619 and then proceeds to step 621. The BS schedules the traffic data on the basis of a short-term CQI fed back from an associated MS corresponding to a target of the traffic data.

The BS adds scheduling information based on a dedicated control message scheduling result and a traffic data scheduling result to the DL MAP in step 621 and then proceeds to step 623. The BS determines whether DL resources to be additionally allocated are present in step 623. If the DL resources to be additionally allocated are determined to be present, the BS returns to step 617. Until the DL resources to be additionally allocated are absent, the BS repeats an operation for scheduling the dedicated control message and the traffic data. If the DL resources to be additionally allocated are determined to be absent in step 623, the BS ends the scheduling operation because it is no longer needed.

When a priority of a signal to be transmitted in the associated DL frame is considered regardless of scheduling order, the scheduling process can be performed by assigning a weight to the dedicated control message.

The length of a MAP message can vary with the number of bursts to be transmitted in a specific DL frame. It is preferred that DL frames are constructed in which BS-by-BS interference cancellation intervals possibly match each other to eliminate ICI or obtain gain with use of an interference cancellation scheme. To match sizes of the interference cancellation intervals within BS-by-BS DL frames, an MCS level can be applied using a "0 padding" scheme in which zero data is padded in a MAP field or a "NULL: No Transmission (Tx)" scheme can be applied in which no signal is transmitted in the associated MAP field. These schemes will be described with reference to FIGS. 7 and 8.

Figure 7:
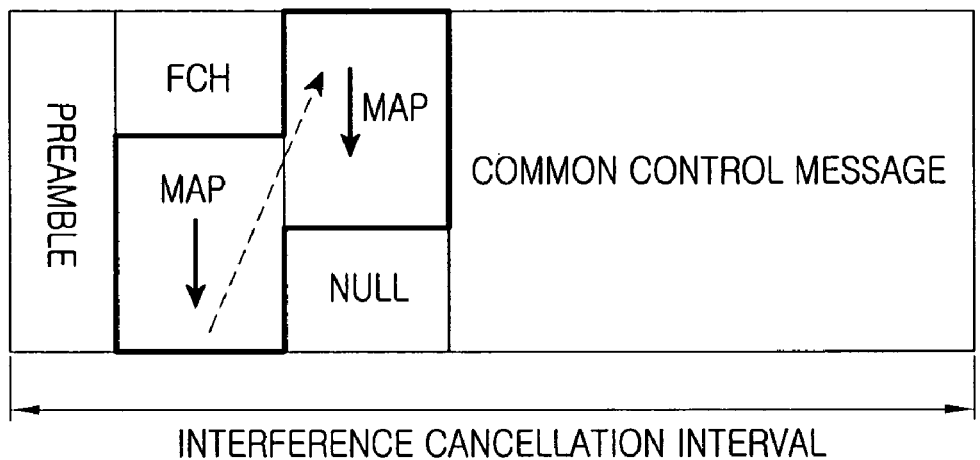
FIG. 7 illustrates an operation for transmitting a MAP message in a MAP field using a "NULL: No Transmission (Tx)" scheme in a DL frame in accordance with the present invention.

FIG. 7 illustrates the operation for transmitting the MAP message in the MAP field using the "NULL or No Tx" scheme in the DL frame in accordance with the present invention.

A MAP field and a field processed in the "NULL: No Tx" scheme as illustrated in FIG. 7 match a MAP field of a DL frame structure of a neighbor cell. When the MAP field is transmitted at an associated MCS level and no signal is transmitted in the remaining field to which the "NULL: No Tx" scheme is applied, gain based on the interference cancellation scheme can be efficiently obtained. In FIG. 7, a part indicated by the bold solid line is a field in which the MAP message is transmitted and the associated MCS level is applied only to the part indicated by the bold solid line.

Figure 8:
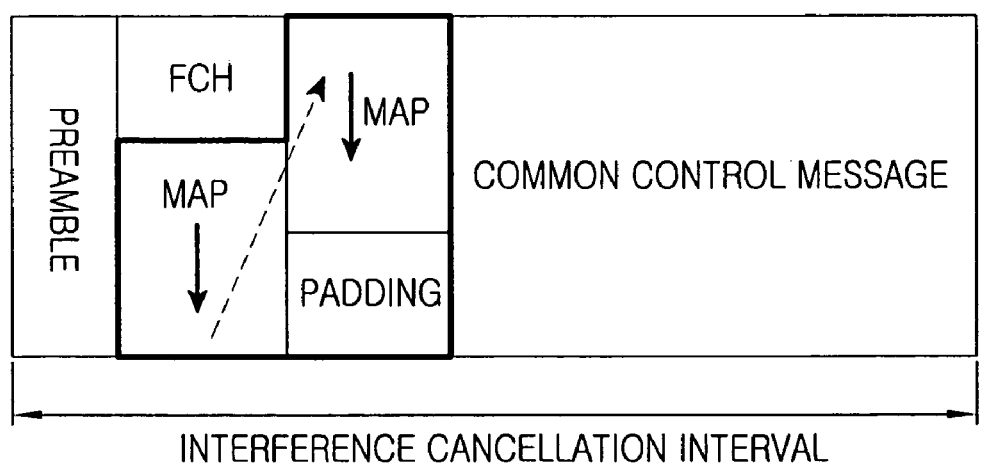
FIG. 8 illustrates an operation for transmitting a MAP message in a MAP field using a "0 padding" scheme in a DL frame in accordance with the present invention.

FIG. 8 illustrates the operation for transmitting the MAP message in the MAP field using the "0 padding" scheme in the DL frame in accordance with the present invention.

A MAP field and a field processed in the "0 padding" scheme as illustrated in FIG. 8 match a MAP field of a DL frame structure of a neighbor cell. An associated MCS level is applied to both the MAP field and a field processed in the "0 padding" scheme, such that gain based on an interference cancellation scheme can be efficiently obtained. In FIG. 8, the associated MCS level is applied to a part indicated by the bold solid line.

Although not illustrated, the BS includes a scheduler and a transmitter. The scheduler schedules a DL frame as described with reference to FIG. 6. The transmitter transmits the DL frame on the basis of a scheduling result. Because the operations of the scheduler and the transmitter are the same as the above-described DL frame scheduling and transmission operations of the BS, a description is omitted.

As is apparent from the above description, the present invention can minimize a service shadow region and ensure service stability by transmitting DL signals in an interference cancellation scheme and a non-interference-cancellation scheme while considering ICI in a cellular communication system in which a frequency reuse factor is 1. The present invention can minimize the complexity of an MS due to the interference cancellation scheme by applying the interference cancellation scheme only to a signal incapable of being retransmitted. The present invention can increase transmission capacity of a BS, minimize the number of retransmissions and enable a stable signal transmission by applying a proper MCS level based on a CQI according to its characteristics without applying any interference cancellation scheme to a signal capable of being retransmitted.

Although the preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for transmitting a Downlink (DL) signal from a Base Station (BS) in a communication system, comprising:
   dividing a DL frame into an interference cancellation interval in which an interference cancellation scheme is applied and a non-interference-cancellation interval in which no interference cancellation scheme is applied;
   generating a first DL signal to be commonly received by all Mobile Stations (MSs) at the BS and a second DL signal;
   transmitting the first DL signal in the interference cancellation interval by applying the first DL signal to the interference cancellation scheme; and
   transmitting the second DL signal in the non-interference-cancellation interval,
   wherein the second DL signal comprises a dedicated control message and traffic data.

2. The method of claim 1, wherein the first DL signal comprises a frame control header, a MAP message and a common control message.

3. The method of claim 2, wherein generating the first DL signal further comprises generating the MAP message with a size equal to that of a MAP message to be commonly received by all MSs at a neighbor BS using the same frequency resources as the BS.

4. The method of claim 3, wherein generating the MAP message with the size equal to that of the MAP message of the neighbor BS further comprises padding zero in a field other than the MAP message in a preset size when the size of the MAP message is less than the preset size.

5. The method of claim 3, wherein generating the MAP message with the size equal to that of the MAP message of the neighbor BS further comprises performing a control operation such that no signal is transmitted in a field other than the MAP message in a preset size when the size of the MAP message is less than the preset size.

6. The method of claim 2, wherein generating the first DL signal further comprises concatenating multiple common control messages when a size of the common control message is less than a preset size.

7. The method of claim 2, wherein generating the first DL signal further comprises fragmenting the common control message into multiple common control message parts such that the common control message is fragmented and transmitted in first time intervals of current and next times when a size of the common control message is greater than a preset size.

8. The method of claim 1, wherein the dedicated control message is transmitted in the non-interference-cancellation interval, and further comprises:
   setting a Modulation and Coding Scheme (MCS) level to be applied to the dedicated control message using performance of a link generated on a basis of an average Channel Quality Indication (CQI) of an MS corresponding to a target of the dedicated control message; and
   modulating, encoding and transmitting the dedicated control message at the set MCS level.

9. The method of claim 1, wherein the traffic data is transmitted in the second time interval further comprises:
   setting a Modulation and Coding Scheme (MCS) level to be applied to the traffic data using performance of a link generated on a basis of a short-term Channel Quality Indication (CQI) of an MS corresponding to a target of the traffic data; and
   modulating, encoding and transmitting the traffic data at the set MCS level.

10. A method for transmitting a Downlink (DL) signal from a Base Station (BS) in a communication system, comprising:
   (a) adding a DL MAP information element to be periodically transmitted in a DL MAP message;
   (b) performing an Uplink (UL) scheduling process and generating a UL MAP message reflecting a UL scheduling result;
   (c) scheduling a common control message;
   (d) scheduling a dedicated burst signal;
   (e) adding scheduling information to the DL MAP message on a basis of the dedicated burst signal scheduling result;
   (f) repeating steps (d) and (e) until DL resources to be additionally allocated are not present;
   (g) transmitting the DL MAP message. the UL MAP message and the scheduled common control message in a first time interval by applying the DL MAP message, the UL MAP message and the common control message to an interference cancellation scheme; and
   (h) transmitting the dedicated burst signal in a second time interval.

11. The method of claim 10, wherein generating the DL and UL MAP messages further comprises generating a MAP message corresponding to a sum of the DL and UL MAP messages with a size equal to that of a MAP message corresponding to a sum of DL and UL MAP messages of a neighbor BS using the same frequency resources as the BS.

12. The method of claim 11, wherein generating the MAP message with the size equal to that of the MAP message of the neighbor BS further comprises padding zero in a field oilier than the MAP message in a preset size when the size of the MAP message is less than the preset size.

13. The method of claim 11, wherein generating the MAP message with the size equal to that of the MAP message of the neighbor BS further comprises performing a control operation such that no signal is transmitted in a field other than the MAP message in a preset size when the size of the MAP message is less than the preset size.

14. The method of claim 10, wherein step (c) further comprises concatenating multiple common control messages when a size of the common control message is less than a preset size.

15. The method of claim 10, wherein step (c) further comprises fragmenting the common control message into multiple common control message parts such that the common control message is fragmented and transmitted in first time intervals of current and next times when a size of the common control message is greater than a preset size.

16. The method of claim 10, wherein step (d) further comprises:
   scheduling a dedicated control message; and
   scheduling traffic data.

17. The method of claim 16, wherein scheduling the dedicated control message further comprises setting a Modulation and Coding Scheme (MCS) level to be applied to the dedicated control message using performance of a link generated on a basis of an average Channel Quality Indication (CQI) of an MS corresponding to a target of the dedicated control message.

18. The method of claim 16, wherein scheduling the traffic data further comprises setting a Modulation and Coding Scheme (MCS) level to be applied to the traffic data using performance of a link generated on a basis of a short-term Channel Quality Indication (CQI) of an MS corresponding to a target of the traffic data.

19. The method of claim 10, wherein the first time interval is prior to the second time interval.

20. An apparatus for transmitting a Downlink (DL) signal from a Base Station (BS) in a communication system, comprising:
   a controller for dividing a DL frame into an interference cancellation interval in which an interference cancellation scheme is applied and a non-interference-cancellation interval in which no interference cancellation scheme is applied;
   a scheduler for scheduling a first DL signal to be commonly received by all Mobile Stations (MSs) at the BS and a second DL signal; and
   a transmitter for transmitting the first DL signal in the interference cancellation interval by applying the first DL signal to the interference cancellation scheme, and transmitting the second DL signal in the non-interference-cancellation interval,
   wherein the second DL signal comprises a dedicated control message and traffic data.

21. The apparatus of claim 20, wherein the first DL signal comprises a frame control header, a MAP message and a common control message.

22. The apparatus of claim 21, wherein the scheduler performs a scheduling process such that a size of the MAP message is equal to that of a MAP message to be commonly received by all MSs at a neighbor BS using the same frequency resources as the BS.

23. The apparatus of claim 21, wherein the scheduler performs a scheduling process such that zero is padded in a field other than the MAP message in a preset size when a size of the MAP message is less than the preset size.

24. The apparatus of claim 22, wherein the scheduler performs a scheduling process such that no signal is transmitted in a field other than the MAP message in a preset size when the size of the MAP message is less than the preset size.

25. The apparatus of claim 21, wherein the scheduler performs a scheduling process such that multiple common control messages are concatenated and transmitted when a size of the common control message is less than a preset size.

26. The apparatus of claim 21, wherein the scheduler performs a scheduling process such that the common control message is fragmented and transmitted in first time intervals of current and next times when a size of the common control message is greater than a preset size.

27. The apparatus of claim 20, wherein the scheduler sets a Modulation and Coding Scheme (MCS) level to be applied to the dedicated control message using performance of a link generated on a basis of an average Channel Quality Indication (CQI) of an MS corresponding to a target of the dedicated control message.

28. The apparatus of claim 20, wherein the scheduler sets a Modulation and Coding Scheme (MCS) level to be applied to the traffic data using performance of a link generated on a basis of a short-term Channel Quality Indication (CQI) of an MS corresponding to a target of the traffic data.

29. An apparatus for transmitting a Downlink (DL) signal from a Base Station (BS) in a communication system, comprising:
- a scheduler for adding a DL MAP information element to be periodically transmitted in a DL MAP message, performing an Uplink (UL) scheduling process and generating a UL MAP message reflecting a UL scheduling result, scheduling a common control message, scheduling a dedicated burst signal, adding scheduling information to the DL MAP message on a basis of the dedicated burst signal scheduling result, and repeating an operation for scheduling the dedicated burst signal and adding the scheduling information to the DL MAP message on the basis of the dedicated burst signal scheduling result until DL resources to be additionally allocated are not present; and
- a transmitter for transmitting the DL MAP message, the UL MAP message and the common control message in a first time interval by applying the DL MAP message, the UL MAP message and the common control message to an interference cancellation scheme, and transmitting the dedicated burst signal in a second time interval.

30. The apparatus of claim 29, wherein the scheduler performs a scheduling process such that a size of a MAP message corresponding to a sum of the DL and UL MAP messages is equal to that of a MAP message corresponding to a sum of DL and UL MAP messages of a neighbor BS using the same frequency resources as the BS.

31. The apparatus of claim 30, wherein the scheduler performs a scheduling process such that zero is padded in a field ocher than the MAP message in a preset size when the size of the MAP message is less than the preset size.

32. The apparatus of claim 30, wherein the scheduler performs a scheduling process such that no signal is transmitted in a field other than the MAP message in a preset size when the size of the MAP message is less than the preset size.

33. The apparatus of claim 29, wherein the scheduler performs a scheduling process such that multiple common control messages are concatenated and transmitted when a size of the common control message is less than a preset size.

34. The apparatus of claim 29, wherein the scheduler performs a scheduling process such that the common control message is fragmented and transmitted in first time intervals of current and next times when a size of the common control message is greater than a preset size.

35. The apparatus of claim 29, wherein the dedicated bunt signal comprises a dedicated control message and traffic data.

36. The apparatus of claim 35, wherein the scheduler sets a Modulation and Coding Scheme (MCS) level to be applied to the dedicated control message using performance of a link generated on a basis of an average Channel Quality Indication (CQI) of an MS corresponding to a target of the dedicated control message.

37. The apparatus of claim 35, wherein the scheduler sets a Modulation and Coding Scheme (MCS) level to be applied to the traffic data using performance of a link generated on a basis of a short-term Channel Quality Indication (CQI) of an MS corresponding to a target of the traffic data.

38. The apparatus of claim 29, wherein the first time interval is prior to the second time interval.

* * * * *